Oct. 12, 1943.  W. T. WELCH ET AL  2,331,750
TEMPERATURE INDICATOR
Filed Dec. 30, 1941  2 Sheets-Sheet 2

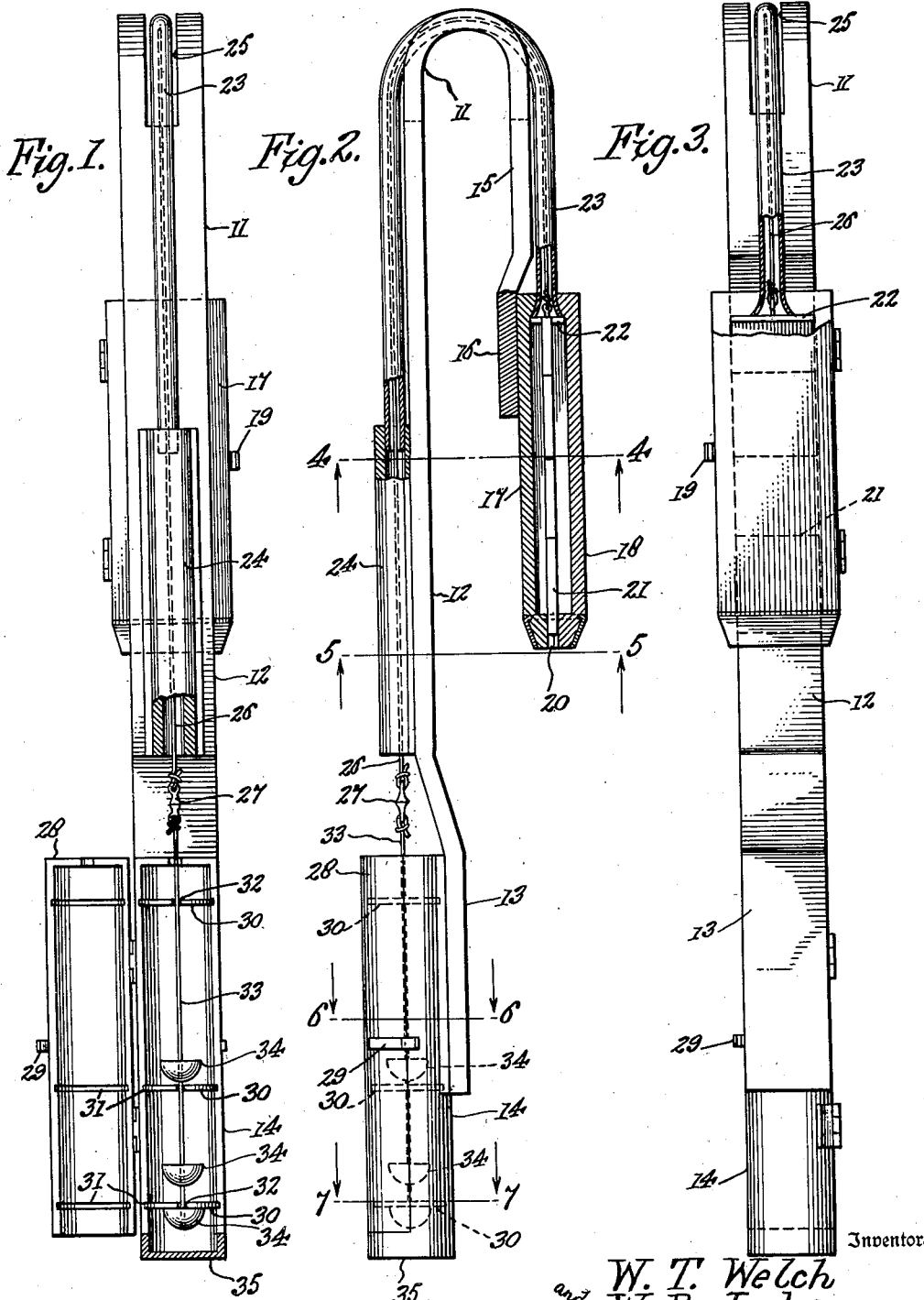

Inventors
W. T. Welch
and W. R. Jackson,
by Mawhinney & Mawhinney
Attorneys.

Patented Oct. 12, 1943

2,331,750

UNITED STATES PATENT OFFICE 2,331,750

TEMPERATURE INDICATOR

William T. Welch and William R. Jackson, New Orleans, La.

Application December 30, 1941, Serial No. 424,986

10 Claims. (Cl. 73—358)

The present invention relates to improvements in indicators and more particularly to devices for indicating a plurality of stages or conditions in sequence.

In the operation of many types of apparatus, such for example as electrical transformers, it is highly desirable to know the load under which the transformer is operating and to indicate when certain stages are reached. Attainment of such stages or conditions will be accompanied by a corresponding increase in temperature within the transformer or other apparatus.

An important object of the present invention is to utilize this increase in temperature to indicate the stage or condition which obtains in the apparatus.

Another object of the invention is to provide an indicator which may be set to indicate any desired stage or values within the apparatus and which will then automatically and accurately indicate such conditions as they are reached.

Another object of the invention is to provide an indicator of this type which can be easily and rapidly reset for a new indicating cycle.

Still another object of the invention is the provision of a device of this character which is of simple construction, inexpensive to manufacture and install, and which is strong, durable and efficient in operation.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevational view of a three stage indicator embodying the invention.

Figure 2 is a side elevational view with parts broken away.

Figure 3 is a rear elevational view with parts broken away.

Figure 4:
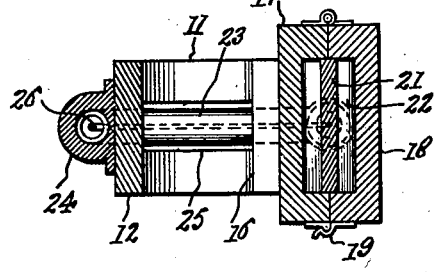
Figure 4 is a horizontal sectional view taken on the line 4—4 of Figure 2 and looking in the direction of the arrows.
Figure 5:
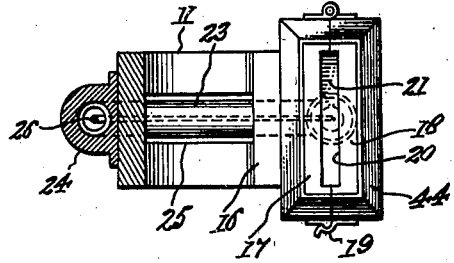
Figure 5 is a sectional view taken on the line 5—5 of Figure 2, looking in the direction of the arrows.
Figure 6:
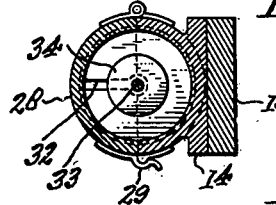
Figure 6 is a similar view taken on the line 6—6 of Figure 2.
Figure 7:
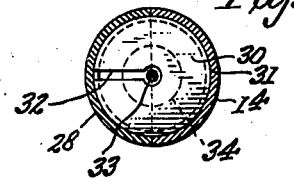
Figure 7 is a sectional view taken on the line 7—7 of Figure 2.

Referring more particularly to the drawings, the numeral 11 indicates a generally inverted U-shaped support having one of its arms of substantially greater length than the other. The longer arm 12 of support 11 has an offset lower portion 13 to which a casing 14 is firmly secured by welding or other suitable means. The shorter arm 15 of the support is provided with an offset lower portion 16 to which a signal housing 17 is secured by welding or other suitable means. The casing 14 and housing 17 are disposed on the outside portion of the arms, as best seen in Figure 2.

The housing 17 is provided with a hinged cover 18 held in closed position by a spring latch 19. An elongated slot 20 is provided in the bottom wall of the housing to receive an indicating flag strip 21 which is normally concealed in the casing with its lower end disposed in the slot 20, as shown in Figure 2. Shoulders 22 are disposed at the upper end of the flag strip to prevent it from dropping completely through the slot 20.

A guide tube 23 extends through a central opening in the top of housing 17, and follows the contour of the U-shaped support 11 on the outside thereof to a point substantially midway of the longer arm 12 where it is telescoped into the upper end of a covering hood 24 secured to the arm 12 and terminating at a point spaced above and in alignment with the center of casing 14. The offset portions 13 and 16 of arms 12 and 15 are sufficiently offset to place the center of housing 17 in line with the guide tube 23 and the center of casing 14 in line with the center of the covering hood 24.

A slot 25 is disposed in the top of support 11 to receive the top portion of the tube 23 so that the uppermost curved portion of tube 23 is substantially flush with the uppermost curved portion of support 11, as shown in Figures 1, 2 and 3.

A suitable wire or other flexible member 26 is secured to the top of flag strip 21 and extends through guide tube 23 and hood 24 to a point below the bottom of the hood, where it is secured to one end of a swivel or other connecting member 27.

The casing 14 is shown as circular in cross-section and is divided longitudinally into hinged sections, the main or body section being secured to arm portion 13 and the movable cover section 28 being adapted to uncover the interior of casing 14. A suitable latch 29 secures the cover 28 in closed position.

The interior of casing 14 is divided by a plurality of spacer discs or partitions 30, shown as three in number for the purpose of illustration and are unequally spaced. The spacer discs 30 are preferably seated in annular grooves 31 provided in the casing 14 and its cover section 28. Each of the discs 30 is provided with a central opening in alignment with a similar opening in the top wall of casing 14. An open slot 32 extends from the central opening in each disc to the side of the disc exposed by opening of the cover section 28, and the slots 32 are disposed in vertical alignment.

A suitable wire or other flexible element 33 is removably secured to the swivel member 27 and extends through the central opening in the top of casing 14 and in the spacer discs 30. The wire 33 is provided with a plurality of unequally spaced fusible enlargements or pellets 34, here shown as three in number, for the purpose of illustration. The wire 33 is passed through the slots 32 in the spacers 30 with the lower pellet disposed below the lower disc 30, the middle pellet disposed between the two lower discs 30 and the upper pellet disposed between the two upper spacer discs 30. The signal flag 21 is sufficiently heavy to exert a pull on wire 26 and wire 33 but the wire 33 is prevented from being pulled out of the casing 14 by the lower pellet which engages the lower side of the bottom spacer disc. The middle pellet is arranged immediately above the lower spacer disc while the upper pellet is disposed immediately above the middle spacer disc. The flag strip 21 is provided with different signals on its surface, such as bands of different colors.

When the lower pellet melts, the wire 33 will be pulled upwardly until the second pellet engages the second or middle disc 30, thereby permitting flag strip 21 to drop a proportionate distance through slot 20 to expose its lowest color band below housing 17. In this position, due to the unequal spacing of the discs 30 and pellets 34, the upper pellet will still be spaced a substantial distance below the upper spacer disc. When the second pellet melts, the top pellet moves up to engage the upper spacer disc, thereby permitting flag strip 21 to move downward to expose the second color band below the housing. When the third pellet melts, the flag strip drops until the shoulders 22 engage the bottom of the housing, and all of the color bands will show below the housing.

The pellets may be formed so as to melt at any desired temperature, but the lowest pellet must melt at the lowest temperature, the second pellet at the next lowest temperature and the upper pellet at the highest temperature. When all of the pellets have melted, the device may be reset for use by removing the wire 33 and the melted pellets and connecting a new wire to swivel 27 with its pellets properly disposed in the casing with relation to the spacer discs, as shown in Figure 1. The melted pellets are collected in the cup 35 formed by the bottom of casing 14 and are easily removed therefrom.

The signal device of this invention may be used wherever desired. As an example of one of its uses, it can be employed in an oil cooled electric transformer to indicate when the load reaches certain definite stages, by indicating when the oil reaches certain temperatures. Assuming that the various stages to be indicated were oil temperatures of 60 degrees, 80 degrees and 95 degrees, the lower pellet would be formed to melt at 60 degrees, the second pellet at 80 degrees, and the upper pellet at 95 degrees. As each stage was reached, the corresponding pellet would melt and show the corresponding color band or other signal on the signal strip 21 below the housing. The pellets are molded about the wire 33 at the desired spaced points in any suitable manner.

In putting the device in use with a transformer, for example, the long arm 12 is inserted in the transformer with the casing 14 immersed in the oil. The curved top portion of the support 11 would rest upon the top of the transformer while the arm 15 would extend down the outside wall with the housing 17 in plain view. Due to the provision of the slot 25, the guide tube 23 does not extend above the support 11 and the transformer cover or top may be moved to closed position. When the last stage has been reached and indicated by flag 21, the device may be removed from the transformer and reset by inserting a new wire 33 in position whereupon it is again ready for use.

Figure 8:
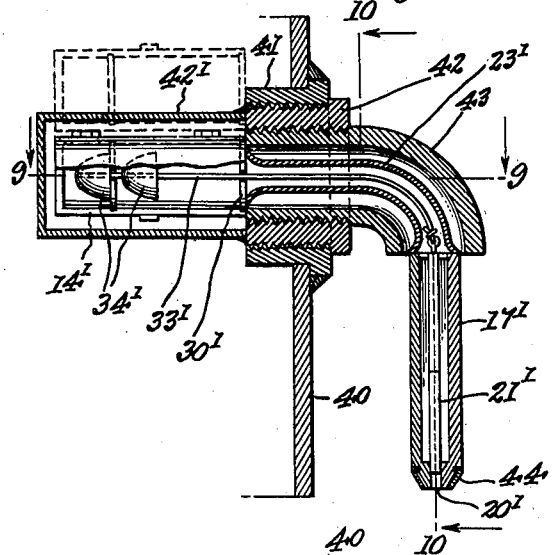
Figure 8 is a vertical sectional view of a two stage indicator, parts being shown in elevation.
Figure 10:
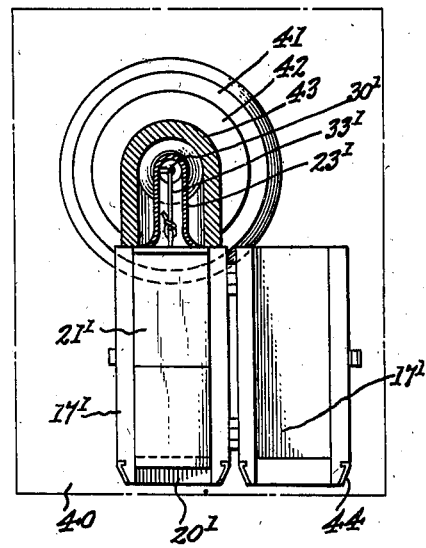
Figure 10 is a sectional view taken on the line 10—10 of Figure 8, parts being shown in elevation.
Figure 9:
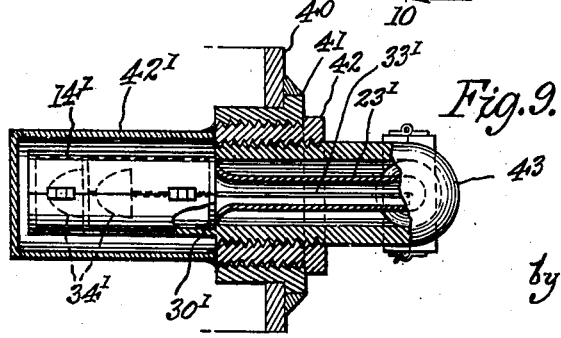
Figure 9 is a sectional view taken on the line 9—9 of Figure 8, parts being broken away and parts being shown in elevation.

In place of being portable and entirely independent of the transformer, as in Figures 1 to 7, the device may be built into the transformer wall, although removable for resetting or for repairs, as shown in Figures 8 to 10. The wall 40 of the transformer is provided with a circular opening into which a cylindrical externally flanged bushing 41 is inserted and welded into place. The bushing 41 is internally threaded and extends inwardly of the wall 40. An intermediate flanged bushing 42 is externally threaded and received in bushing 41. A casing 42' is secured to the inner end of bushing 42 and has a smaller overall diameter than the threaded exterior of bushing 42 so as to be insertable through the bore of bushing 41. An L-shaped pipe 43 has its straight body exteriorly threaded and adapted to be removably received in the interiorly threaded bore of bushing 42 with its outer end turned downwardly as indicated in Figure 8. A guide tube 23' extends through pipe 43 and is flared at its ends with its flared ends secured to the ends of the L-pipe 43.

A casing 14' is secured by suitable means such as welding to the end of pipe 43 and extends into casing 42' concentrically therewith but spaced from the walls thereof. The overall diameter of casing 14' is less than that of the pipe 43. By this construction, casing 42' becomes an integral part of bushing 42 and serves to protect casing 14' from the oil in the transformer while casing 14' becomes an integral part of pipe 43 and can be removed therewith for resetting or for repairs of any kind. While the hot oil is prevented from contacting casing 14' directly, it will heat casing 14' and the pellets therein. If the device is not to be used with a transformer, the entire device is removed and a suitable plug inserted in bushing 41 to close the opening therein.

The signal housing 17' is suitably supported immediately below the open down turned end of pipe 43. The housing 17' and its flag 21' are of the same construction and operation as the housing and flag of the other figures. The casing 14' is also of the same construction as the casing of the other figures, but for the purpose of illustration only two spacer discs 30' are shown. A flexible wire 33' is provided with two spaced pellets 34' to engage the discs, and the wire 33' extends through the guide tube and is connected to the flag 21'. In this construction two stages will be indicated by flag 21' as the pellets melt. The entire device may be removed by unscrewing bushing 42, while the L-shaped pipe with the casing 14' may be removed from the bushing 42 and casing 42' if desired. The device may be installed in the transformer at the factory or may be installed in transformers in use by the simple expedient of drilling an opening in the transformer wall to receive the bushing 41.

A suitable weather stripping 44 may be applied to the bottom of housings 17 and 17' to prevent clogging of slots 20 and 20' by snow, sleet or the like. Although casing 14' is horizontally disposed, it will operate in the same manner as the vertical casing 14 of Figure 1 due to the pull exerted on wire 33' by the flag strip.

In place of the gravity action of the flag strip on the pellet carrying wire, suitable resilient means may be employed to bias the pellet carrying wire. Any desired number of pellets and discs may be employed and the pellets made of metal or other suitable material and may be made to melt at any desired temperature.

It is obvious that various changes and modifications may be made in the details of construction and design of the above specifically described embodiment of this invention without departing from the spirit thereof, such changes and modifications being restricted only by the scope of the following claims.

What is claimed is:

1. In a signal device, a signal flag movable to a plurality of signalling positions and biased towards said signalling positions, a casing having a plurality of spaced abutments, a flexible restraining element connected to said signal flag and extending into said casing, and spaced projections carried by said restraining element in alignment with the spaced abutments, one of said projections being in contact with one of the abutments to prevent movement of the signalling flag to signalling position, said projections being fusible at different temperatures and the spacing of the abutments and projections being such that when the projection contacting one of the abutments fuses, the restraining element and flag will move to a position where the next projection engages the next abutment, said first projection being fusible at a temperature lower than any succeeding projection.

2. In a signal device, a casing, a plurality of spaced abutments disposed in said casing, a signal flag biased to move to a plurality of signalling positions, a flexible restraining element connected to said signal flag and extending into said casing in proximity to said spaced abutments, a plurality of spaced fusible projections fusible at different temperatures carried by the restraining element and adapted to engage the abutments, said abutments being spaced a greater distance apart than said fusible projections so that as a fusible projection is melted, the restraining element will move a substantial distance before the next fusible projection engages the next abutment, the projection contacting an abutment fusible at a lower temperature than any succeeding projection.

3. In a signal device, a substantially inverted U-shaped support, a housing carried by one arm of the support, a signal flag disposed in said housing and movable to a plurality of signalling positions, a casing carried by the other arm of said support, a plurality of spaced abutments in said casing, a flexible element connected at one end to said signal flag and extending around said support and into said casing past said abutments, a fusible projection carried by the flexible element and engaging one of said abutments, a second fusible projection carried by said flexible element at a point spaced from said first fusible projection and spaced a substantial distance from the next abutment, said projections being fusible at different temperatures with the projection contacting an abutment fusible at a lower temperature than any succeeding projection, said signal flag being biased towards its signalling positions and restrained by engagement of the fusible projection with the adjacent abutment, said arrangement causing the second projection to move into engagement with the next abutment upon fusing of the first projection.

4. In a signal device, a substantially inverted U-shaped support, a housing carried by one arm of the support, a signal member disposed in said housing and movable to a plurality of signalling positions, a casing carried by the other arm of said support, a plurality of spaced abutments in said casing, a flexible element connected at one end to said signal member and extending around said support and into said casing past said abutments, a fusible projection carried by the flexible element and engaging one of said abutments, a second fusible projection carried by said flexible element at a point spaced from said first fusible projection and spaced a substantial distance from the next abutment, said signal member being biased towards its signalling positions and restrained by engagement of the fusible projection with the adjacent abutment, said arrangement causing the second projection to move into engagement with the next abutment upon fusing of the first projection, said second projection being fusible at a higher temperature than the first projection.

5. In a signal device, a substantially inverted U-shaped support, a housing carried by one arm of the support, a signal member disposed in said housing and movable to a plurality of signalling positions, a casing carried by the other arm of said support, a plurality of spaced abutments in said casing, a flexible element connected at one end to said signal member and extending around said support and into said casing past said abutments, a fusible projection carried by the flexible element and engaging one of said abutments, a second fusible projection carried by said flexible element at a point spaced from said first fusible projection and spaced a substantial distance from the next abutment, said signal member being biased towards its signalling positions and restrained by engagement of the fusible projection with the adjacent abutment, said arrangement causing the second projection to move into engagement with the next abutment upon fusing of the first projection, said second projection being fusible at a higher temperature than the first projection, and a guide tube carried by the support and slidably receiving the flexible element.

6. In a signal device, a substantially inverted U-shaped support, a housing carried by one arm of the support, a signal member disposed in said housing and movable to a plurality of signalling positions, a casing carried by the other arm of said support, a plurality of spaced abutments in said casing, a flexible element connected at one end to said signal member and extending around said support and into said casing past said abutments, a fusible projection carried by the flexible element and engaging one of said abutments, a second fusible projection carried by said flexible element at a point spaced from said first fusible projection and spaced a substantial distance from the next abutment, said signal member being biased towards its signalling positions and restrained by engagement of the fusible projection with the adjacent abutment, said arrangement causing the second projection to move into engagement with the next abutment upon fusing of the first projection, said second projection being fusible at a higher temperature than the first projection, said abutments comprising partitions dividing said casing and having aligned openings to slidably receive the flexible element.

7. In a signal device, a supporting wall having an opening extending therethrough, a guide tube extending through said opening, a casing carried by said tube on one side of the wall, a housing disposed adjacent the other end of the tube on the other side of the wall, a signal member in said housing and having a plurality of signalling positions, a plurality of spaced abutments disposed in said casing, a flexible element connected to the signal member and extending through said tube and into said casing past said abutments, a fusible projection carried by the flexible element and engaging one of said abutments, a second fusible projection having a higher fusible temperature than the first mentioned projection on the flexible element and spaced from said first projection and from the next adjacent abutment, said signal member being biased toward its signalling positions and restrained by engagement of the fusible projection with the adjacent abutment so that when said first projection is fused the second projection will move into engagement with the next abutment.

8. In a signal device, a supporting wall having an opening extending therethrough, a guide tube extending through said opening, a casing carried by said tube on one side of the wall, a housing disposed adjacent the other end of the tube on the other side of the wall, a signal member in said housing and having a plurality of signalling positions, a plurality of spaced abutments disposed in said casing, a flexible element connected to the signal member and extending through said tube and into said casing past said abutments, a fusible projection carried by the flexible element and engaging one of said abutments, a second fusible projection on the flexible element and spaced from said first projection and from the next adjacent abutment, said signal member being biased toward its signalling positions and restrained by engagement of the fusible projection with the adjacent abutment so that when said first projection is fused the second projection will move into engagement with the next abutment, said first projection being fusible at a lower temperature than the second projection, said abutments comprising partitions dividing said casing and having aligned openings to slidably receive the flexible element.

9. In a signal device, a substantially inverted U-shaped support, a housing carried by one arm of the support, a signal member disposed in said housing and movable to a plurality of signalling positions, a casing carried by the other arm of said support, a plurality of spaced abutments in said casing, a flexible element connected at one end to said signal member and extending around said support and into said casing past said abutments, a fusible projection carried by the flexible element and engaging one of said abutments, a second fusible projection carried by said flexible element at a point spaced from said first fusible projection and spaced a substantial distance from the next abutment, said signal member being biased towards its signalling positions and restrained by engagement of the fusible projection with the adjacent abutment, said arrangement causing the second projection to move into engagement with the next abutment upon fusing of the first projection, said second projection being fusible at a higher temperature than the first projection, said abutments comprising partitions dividing said casing and having aligned openings to slidably receive the flexible element, there being open slots leading from one edge of each partition into the opening therein, said slots of the partitions being disposed in alignment, and means to open and close the portion of the casing covering the open ends of the partition slots.

10. In a signal device, a casing, a plurality of spaced abutments disposed in said casing, a movable element extending into the casing, a fusible projection carried by said movable element and engaging one of said abutments to hold said element against movement through the casing, a second projection fusible at a higher temperature than the first mentioned projection carried by said movable element in alignment with the next abutment but spaced a substantial distance therefrom, and a signal flag carried by said movable element whereby when the first mentioned projection fuses the movable element and flag will move until the second projection engages the next abutment.

WILLIAM T. WELCH.
WILLIAM R. JACKSON.